US006275863B1

(12) United States Patent
Leff et al.

(10) Patent No.: US 6,275,863 B1
(45) Date of Patent: Aug. 14, 2001

(54) SYSTEM AND METHOD FOR PROGRAMMING AND EXECUTING LONG RUNNING TRANSACTIONS

(75) Inventors: Avraham Leff, New Hempstead; Francis N. Parr, Croton-on-Hudson, both of NY (US); James T. Rayfield, Ridgefield, CT (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/236,532

(22) Filed: Jan. 25, 1999

(51) Int. Cl.$^7$ .................................................. G06F 13/00
(52) U.S. Cl. ........................... 709/248; 707/201; 707/202
(58) Field of Search ..................................... 707/201, 202, 707/203, 204; 709/203, 230, 231, 232, 248

(56) References Cited

U.S. PATENT DOCUMENTS

| | | | |
|---|---|---|---|
| 5,930,786 | * | 7/1999 | Cariño, Jr. et al. ....................... 707/4 |
| 6,138,143 | * | 10/2000 | Gigliotti et al. ...................... 709/203 |
| 6,144,941 | * | 7/2000 | Hotti et al. ................................. 705/4 |
| 6,157,927 | * | 12/2000 | Schaefer et al. ...................... 707/103 |
| 6,169,989 | * | 2/2001 | Eichstaedt et al. ................... 707/100 |
| 6,182,241 | * | 1/2001 | Nagai et al. ............................ 714/16 |

OTHER PUBLICATIONS

"A novel timestamp ordering approach for co–existing traditional and cooperative transaction processing," by Yanchun Zhang et al. Cooperative Information Systems, Proceedings, 3rd IFCIS Conference, pp 132–141, 1998.*

"Using Constraints to Manage Long Duration Transactions in Spatial Information Systems," By Dean Kuo et al., Cooperative Infomation Systems, Proceedings, 3rd IFCIS International Conference, pp 284–395, 1998.*

Leymann et al., "Workflow–based applications," Systems Journal, vol. 36, No. 1, http://www.almaden.ibm.com–1997.

Molina et al., "Coordinating Activities Through Extended Sagas: A Summary," IEEE, pp. 568–573, 1991.

Gray et al., "Transactions Processing: Concepts and Techniques," pp. 3–7, 72–74, 217–219, 430–432, 434–435, 1993.

* cited by examiner

Primary Examiner—John A. Follansbee
Assistant Examiner—Walter Benson
(74) Attorney, Agent, or Firm—F. Chau & Associates, LLP

(57) ABSTRACT

A method for programming and executing long running transactions between interface devices and a server includes the steps of providing a predicate set and a transform set on the interface devices pursuant to an activity to be performed by the long running transaction, the predicate set defining conditions for which updates to states in accordance with the activity are to be made and the transform set for applying the updated states pursuant to the predicate set, committing the activity for processing upon establishment of communication with the server from the interface device, establishing communication with the server from the interface device to initiate the long running transaction, replaying the predicate set and the transform set for the server to determine if the long running transaction is capable of being committed on the server and if capable of being committed on the server, committing the long running transaction to update states of the server wherein a plurality of interface devices are capable of executing long running transactions concurrently while competing to update states of the same data on the server and while maintaining transactional consistency. A system for programming long running transactions is also disclosed.

20 Claims, 8 Drawing Sheets

SYSTEM AND METHOD FOR PROGRAMMING AND EXECUTING LONG RUNNING TRANSACTIONS

BACKGROUND OF THE INVENTION

1. Field of the Invention

The present invention relates to transaction systems and, more particularly, to a system and method for programming and executing long running transactions which guarantee correctness and avoid failures from conflicts with other applications that access the same resources.

2. Description of the Related Art

Transaction processing over a network provides interactions between client or user stations. Transaction processing systems such as form processing systems, automatic teller machines (ATM) and the like, provide user interfaces which support "short running" transactions. Short running transactions are fast (often milliseconds) and include instructions supplied to or by a system server from/to user stations. The short running transactions which access an object, use locks to deny access to the object or similar objects in the server's database by others at the time of access.

For distributed computational systems, a unifying concept is implemented to provide consistent, safe and reliable transactions. This concept is called ACID. ACID stands for atomicity, consistency, isolation and durability. Atomicity represents a transaction's changes to state. Either all changes happen or none happen. These changes may include any state changes to objects, data, etc. Consistency requires that the view of shared resources presented to any one transaction be consistent with the semantic or integrity constraints on those resources. For example, if a system can show a set of account balances for a bank branch and the total balance for the branch, then the values presented to any one transaction should add up, i.e. the sum of the presented account balances must be equal to the value presented as the branch total. In other words, the actions taken as a whole should not violate the integrity constraints associated with the state. Isolation represents that even though the transaction may execute concurrently; it appears to each transaction that each other transaction occurred either entirely before or entirely after it, but not both. Durability represents that once a transaction completes successfully (commits); its changes to the state survive failures. These concepts are described in detail in *Transaction Processing: Concepts and Techniques*, by Gray and Reuter, Morgan Kaufmann Publishers San Francisco, Calif. 1993 (ISBN 1-55860-190-2), incorporated herein by reference.

To achieve ACID conditions, short running transactions are typically employed. Transaction servers supporting short running systems subject users to lock outs until other transactions with access to shared resources for which that user is competing have completed and released their locks. For example, an ATM machine may lock out additional users trying to access the same bank account. Short transactions provide access to the server for short duration interactions. When processing a short running transaction that accesses a particular object, all other users are locked out and must wait until the server has processed the prior transaction(s). This results in a bottleneck which becomes time consuming when many users attempt to access the object on the server. Existing short running transaction systems predefine the lock modes available for each object. These are typically Shared (S) and Exclusive (X). For read-only access to the object to proceed, the transaction must have an S or an X lock on the object. For read-write access to the object to proceed, the transaction must have an X lock. If any transaction is reading the object, all other transactions are prevented from writing to the object. In addition, if any transaction is writing to the object, all other transactions are prevented from having any access (read or write) to the object. This causes extremely long lock-wait times (and hence extended transaction response times) in traditional systems where the amount of contention for shared resources or the lock-hold life times become long.

Attempts have been made to increase throughput and to provide more easily accessed systems. Field calls have been used in systems such as IMS FastPath™, and are described in *Transaction Processing: Concepts and Techniques*, by Gray and Reuter, Morgan Kaufmann Publishers San Francisco, Calif. 1993 (ISBN 1-55860-190-2). Field calls are used to minimize the lock footprint in terms of the amount of data locked and the time the lock is held, and are used in the prior art only to drive short running transactions. Escrow locks, also discussed by Gray and Reuter are a refinement of field calls, also applied in the context of short running transactions.

Optimistic transactions are a known technique in which objects in a transaction are not locked during the course of a transaction. The transaction commits if and only if the state of participating objects in the datastore has not changed since the beginning of the transaction thus indicating that no other user has touched the object. Optimistic transactions are degenerate forms of field calls. Because optimistic transactions require rolling back a transaction if the state of any object has changed in any way, they unnecessarily reduce throughput since the change in state may not actually require the transaction to be aborted. For example, even if an account's balance has changed (due to another withdrawal) in the course of a funds transfer operation, the operation should still be able to proceed as long as the balance is sufficiently large to cover both withdrawals.

Workflow and Sagas are two technologies which begin to address system and server design for long running units of business and business processes. Workflow, as characterized by the IBM product MQ series Workflow (previously known as IBM Flowmark) and the WorkFlow management Coalition (WfMC) standards, provides approaches to providing automated management and control of "long running" business processes involving collections of users. Workflow systems manage recovery of the state of the workflow (i.e., they know reliably which activities have been started and which have been completed, etc.) but do not address recovery of resources manipulated as part of the activities which make up the workflow, nor do they provide an approach for handling contention when activities from different business processes must compete for access to shared resources.

Sagas (see "Coordinating activities through extended sagas: a summary", H. Garcia-Molina et al., Compcon Spring '91, Digest of Papers, pages 568–573) require the programmer to code a set of compensating transactions and do not support concurrency. This art does not address or provide an approach to managing contention for shared resources. Further, traditional lock modes usually involve a closed (i.e., fixed set) of lock modes which preclude concurrent usage of the same objects.

Versioning for objects to be accessed has been used for long running transactions, but the task of reconciling conflicting versions is left to the user. This is not preferred since the user must manually determine the version of the object needed to perform the transaction.

Therefore, a need exists for a system and method for providing concurrent usage of objects in a database to increase throughput in long running transactions. A further need exists for a system and method for executing long running transactions which implement ACID properties and avoid false conflicts with other applications.

SUMMARY OF THE INVENTION

A method for programming and executing long running transactions between interface devices and a server includes the steps of providing a predicate set and a transform set, the predicate set defining conditions for which updates to states in accordance with the activity are to be made and the transform set for applying the updated states pursuant to the predicate set, committing the activity for processing upon establishment of communication with the server from the interface device, establishing communication with the server from the interface device to initiate the long running transaction, replaying the predicate set and the transform set for the server to determine if the long running transaction is capable of being committed on the server and if capable of being committed on the server, committing the long running transaction to update states of the server wherein a plurality of interface devices are capable of executing long running transactions concurrently while competing to update states of the same data on the server and while maintaining transactional consistency.

In other methods, the step of replaying the predicate set and the transform set for the server may include the steps of initiating a compressed version of the predicate set and the transform set for the long running transaction to compare against information included on a server database, to determine failures, if failures are encountered, rolling back the compressed version and aborting the long running transaction and otherwise, rolling back the compressed version and committing the long running transaction. The states of the server are preferably object based and the step of committing the long running transaction may further include the step of automatically selecting versions of the objects to permit concurrent access to the same objects by the plurality of interface devices. The objects may include open lock modes for excluding predetermined interface devices and predetermined transactions from being performed. The long running transaction preferably complies with ACID (atomicity, consistency, isolation and durability). The server may be other than an externally coordinatable transaction system and the step of committing the long running transaction may further include the step of invoking a sequence of operations to mimic the predicate and transform sets for execution on the server. The method may further include the step of providing an operational log to record the predicates and transforms to provide a compressed version of the long running transaction.

Another method for programming and executing long running transactions between interface devices and a server includes the steps of interacting with an interface device to initiate a long running transaction, providing a predicate set on the interface device for determining if the long running transaction is capable of being processed, providing a transform set on the interface device associated with the predicate set, the transform set for carrying out instructions pursuant to the predicate set, logging a compressed version of the predicate set and the transform set in an operational log on the interface device, establishing communication with the server from the interface device, replaying the compressed version of the predicate set and the transform set from the operational log to compare against information included on a server database, to determine failures and committing the long running transaction by accessing information from the server data base such that a plurality of interface devices are capable of accessing the same information in the server data base at the same time.

In other methods, the step of replaying may include the steps of, if failures are encountered, rolling back the compressed version and aborting the long running transaction and otherwise, rolling back the compressed version and committing the long running transaction. The information from the server data base is preferably object based and the step of committing the long running transaction may further include the step of automatically selecting versions of the object based information to permit concurrent access to the same object based information by the plurality of interface devices. The object based information may include open lock modes for excluding predetermined interface devices and predetermined transactions from being performed and permitting concurrent access to the object based information. The long running transaction preferably complies with ACID (atomicity, consistency, isolation and durability). The server may be other than an external transaction coordination system and the step of committing the long running transaction may further include the step of invoking a sequence of operations to mimic the predicate and transform sets for execution on the server.

A system for programming and executing long running transactions includes interface devices having a long running transaction system for initiating and maintaining long running transactions and a server capable of establishing communication with the interface devices for interacting with and processing the long running transaction with the interface devices. The long running transaction system further includes means for providing a predicate set and a transform set on an interface device for initiating a long running transaction, the transform sets for carrying out instructions pursuant to the predicate set, means for replaying the predicate set and the transform set for the server to compare against information included on a server database, to determine failures and means for committing the long running transaction by accessing information from the server data base such that a plurality of interface devices are capable of accessing the same information in the server data base at the same time.

In alternate embodiments, the means for replaying may include means for providing a compressed version of the predicate set and the transform set for the long running transaction to compare against information included on a server database, to determine failures such that if failures are encountered, the compressed version is rolled back and the long running transaction is aborted, otherwise, the compressed version is rolled back and the long running transaction is committed. The information from the server data base is preferably object based and the means for committing the long running transaction may further include automatic selection of versions of the object based information to permit concurrent access to the same object based information by the plurality of interface devices. The object based information includes open lock modes for excluding predetermined interface devices and predetermined transactions from being performed and permitting concurrent access to the same object based information. The long running transaction preferably complies with ACID (atomicity, consistency, isolation and durability). The server may be other than an external transaction coordination system and the means for committing the long running transaction may further include a sequence of operations invoked to mimic the predicate and transform sets for execution on the server. The system may further include an operational log to record the predicates and transforms to provide the compressed version of the long running transaction.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
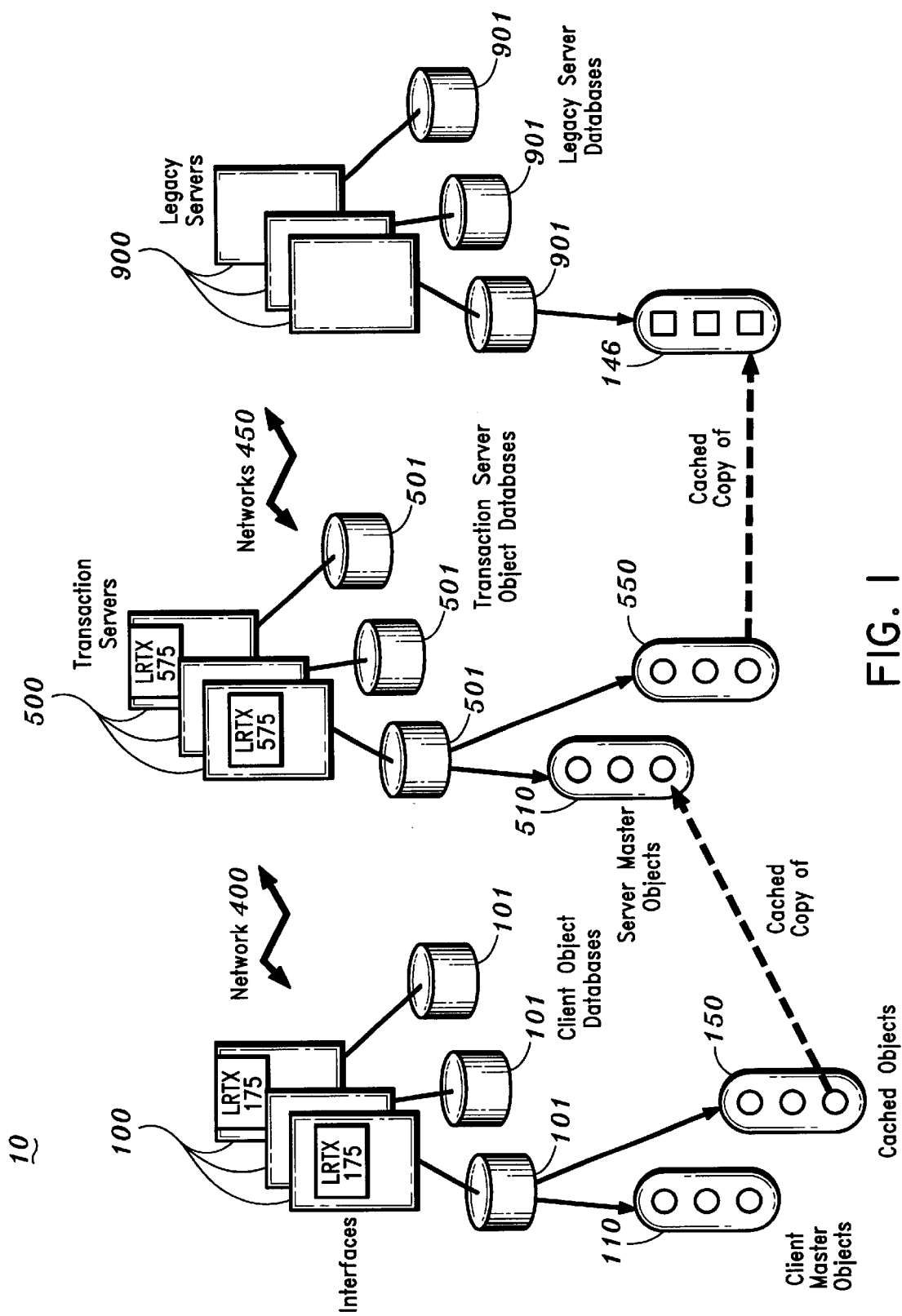
FIG. 1 is a block diagram of a system for implementing long running transactions in accordance with the present invention.

The present invention relates to transaction systems and, more particularly, to a system and method for programming and executing long running transactions which provides correctness and avoids failure from conflicts with other applications that access the same resources. The present invention provides a system and method in which a plurality of interface devices are used for accessing a transaction hub or server which provides controls for accessing and modifying the states of information stored in a database. The present invention includes the capability of accessing information in the database without locking out other users which access the same database resources for an extended periods of time. The present invention supports long running transactions which permit concurrent use by a plurality of users while providing correct transactional execution and minimizing conflict with other applications.

The present invention addresses, inter alia, a problem not solved in workflow systems, that is, how to manage the completion of concurrent long running transactions, and return any shared durable resources to a consistent state in the event of a failure. In addition, the present invention provides an efficient approach to coping with contention between transactions for shared resources. As described, a long running transaction is a group of interactions by one or more users with a transaction server system, which preferably makes up a unit of business or business process as perceived by the initiating users. For long running transactions, a single unit of business or transaction may extend over any period of time needed to complete the transaction, i.e, seconds, minutes, days, etc.

A high performance transaction server system needs to support many units of business i.e., transactions, executing concurrently which are initiated by different users. In the prior art, concurrently executing transactions will conflict in accessing and updating shared business resources. The transaction server system in accordance with the present invention, however, provides a method to manage and resolve these conflicts while permitting transactions to complete efficiently.

A long running transaction is a group of interactions by one or more users with a transaction server system, which preferably makes up a unit of business or business process as perceived by the initiating users. Long running transactions are distinguished from conventional "short" running transactions by the fact that the expected amount of conflict between transactions over shared resources is high enough that conventional short running transaction policies to resolve resource conflict are impractical. A standard resolution policy for short running transactions is to lock resources when they are made available to any one transaction, and have any other transaction competing for that resource wait until the first transaction completes and releases its locks. For short running transaction servers with sub-second transaction completion times, the resulting wait for shared resources in each transaction is acceptable. However, for long running transactions, which may be characterized by a need for concurrent transactions where contention exists between transactions, a policy of waiting for competing transaction completions before being given access to contended resources is not acceptable to users initiating the transactions.

Another characteristic of long running transactions is that each transaction represents enough work that it is important to be able to restart the work from an intermediate point if this is a failure in some part of the transaction server system. The present invention provides a solution for this problem through check pointing and other methods (e.g., by using an operational log). The result is a transaction system durable enough to survive server failure which can restart the transaction at the intermediate point where the transaction server had failed. This is particularly useful in a long running transaction environment where it would be unacceptable to users of the system to have to restart their transactions from the beginning in the event of a failure of a part of the transaction server system.

It should be understood that the elements shown in FIGS. 1–5 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a block diagram of an embodiment of the present invention which incorporates the infrastructure that supports the correct execution of long running transactions as described above.

In accordance with the present invention long running transactions are provided which ensure concurrent usage of the same system resources. A system 10 includes three sets of computing nodes. Nodes 100 represent clients that initiate long running transactions. Nodes 100 may include computers, Personal Digital Assistants (PDA's), automatic teller machines (ATM's) or any other device capable of initiating transactions. Nodes 500 represent servers preferably including data bases 501. Nodes 900 may also be included instead of nodes 100 or in addition to nodes 100. Nodes 900 represent servers or servers which support only conventional short running transactions and often do not permit external coordination of their transactions. The latter type of servers will often have persistent legacy stores or databases 901 which are used for durable records. Databases 101 may also reside on client nodes 100. Databases 101 and 501 are preferably object oriented data bases.

Object oriented data bases preferably include objects including data encapsulated by code, for example, Java objects. Object databases refer to database systems that support external coordination of ACID transactions. The legacy servers on node 900 may be different from servers 500 in that the servers on node 900 usually support transactions but not long running transactions, do not permit external coordination of transactions in which they are involved, use durable data in a conventional database or legacy file system rather than being organized as object oriented data. The present invention provides a method for processing long running transactions on these legacy system as well as similar systems thereby permitting participation of such systems which may include a large amount of stored and maintained resources. The present invention may be practiced with either legacy systems 900 or server systems 500 or both as shown in FIG. 1.

The object databases on nodes 100 preferably include two sets of objects. Objects 110 represent objects whose master copy or version resides on and is owned by that client server or interface device (node 100). Objects 150 are cached versions of objects whose master version resides in an object database 510 attached to a server on node 500. The object databases on nodes 500 include two sets of objects. Objects 510 represent a master version or copy of objects (though cached objects may be resident elsewhere), and objects 550 represent objects which are cached copies of data which resides on a legacy business systems on node 900 or on its attached database or file server 901.

On each node 100, a long running transactions (LRTX) system 175 is instantiated and is responsible for ensuring that the appropriate LRTX semantics are applied to long running transactions that are initiated on node 100. Similarly, on each node 500, an LRTX system 575 is instantiated to manage long running transactions running on node 500. Long running or long transactions are transactions which provide longer access times between interface devices at nodes 100 to servers at nodes 500.

Nodes 100 are connected, possibly intermittently, to one or more of the object database servers 500, through a network or set of networks 400. The object database servers 500 are connected to one or more of the legacy business nodes 900 through a network or a set of networks 450.

Figure 2:
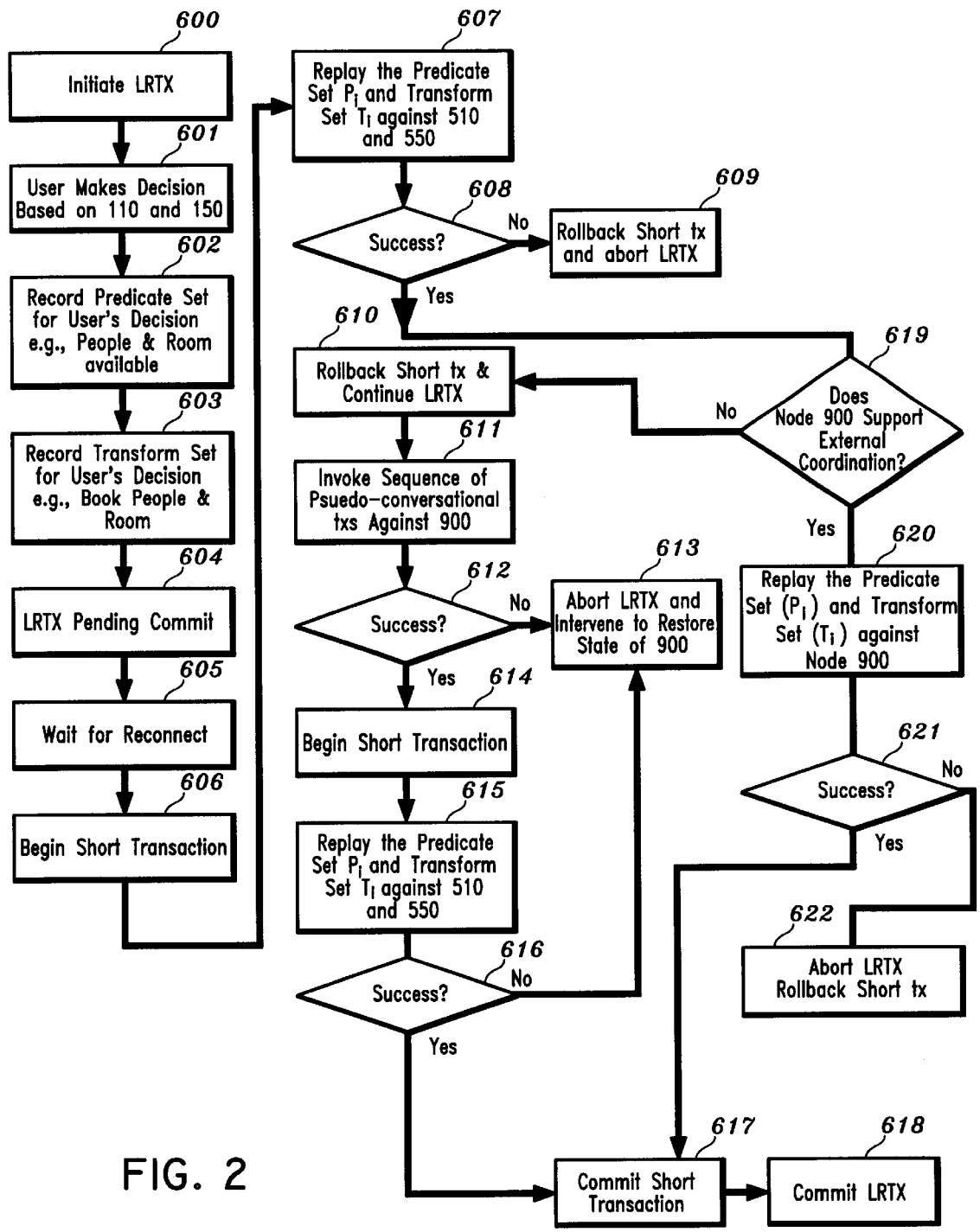
FIG. 2 is a flow diagram showing an illustrative method for the system of FIG. 1 in accordance with the present invention.
Figure 3:
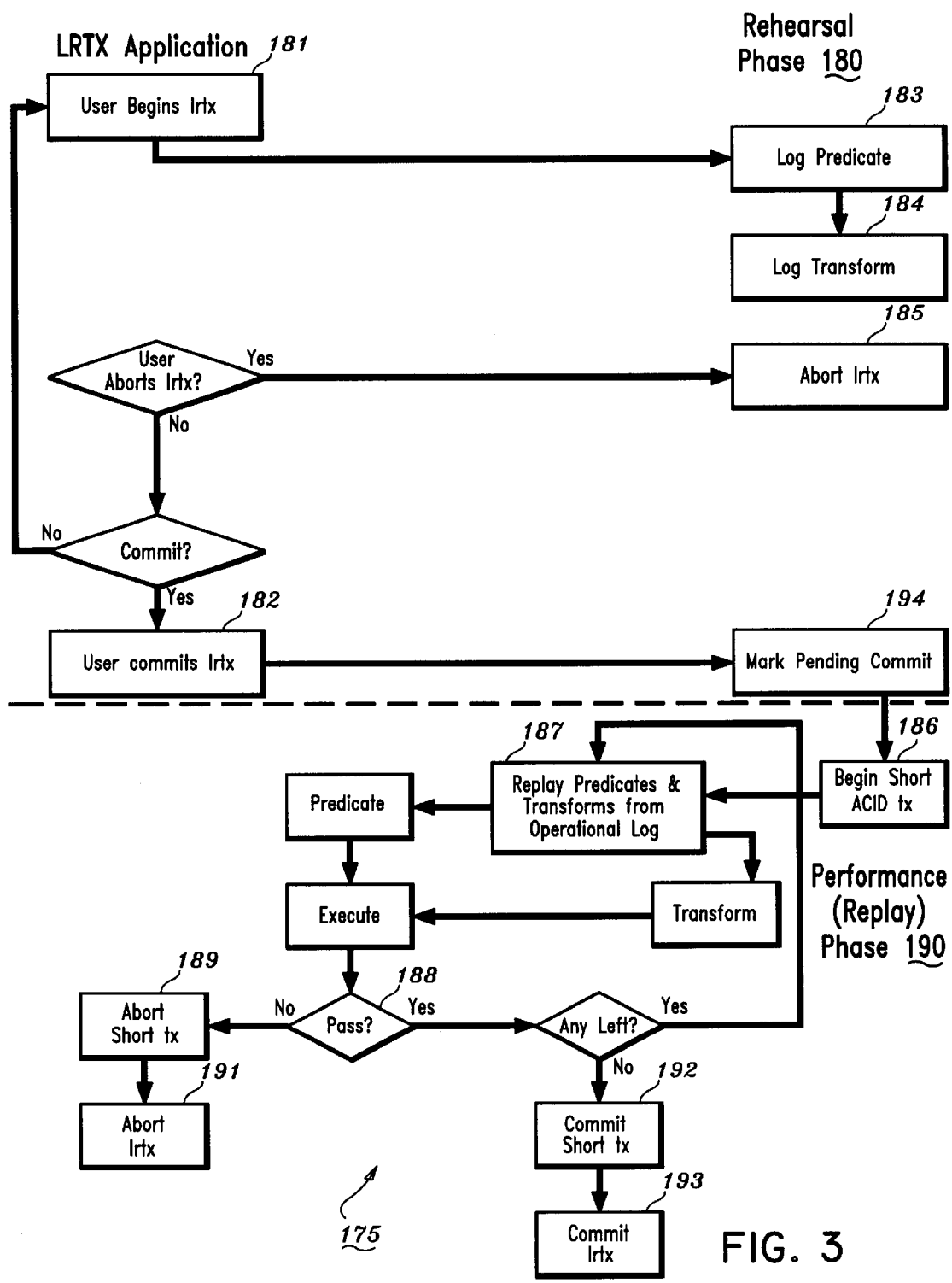
FIG. 3 is a flow/block diagram of a long running transaction system for implementing long running transactions from user interfaces in accordance with the present invention.

Referring to FIG. 2, a flow/block diagram depicts a long running transaction by way of a non-limiting example. In the example, an application that schedules a meeting among multiple participants in a meeting room with specified constraints is considered. The user's calendar resides on a personal digital assistant (PDA) (e.g., node 100 of FIG. 1) as the master version (110 of FIG. 1), whereas other people's "free time lists" are cached (150 of FIG. 1) on the PDA, and the master version resides in an object database on a server node (500 of FIG. 1). In this example, the users PDA is an interface device, however other interface devices, such as personal computers, ATMs, terminals, lap tops, etc. may be used. The application runs a transaction to change people's calendars and determine meeting room listings to be made with ACID properties (e.g., to be made atomically). The transaction is a long running transaction because of the long "think times" that are involved in such an application.

Referring to FIGS. 1 and 2, meeting room assignments are made by using a legacy business system (e.g., node 900). Object versions of this data are cached on the server nodes (500). In block 600, a user running on node 100, perhaps a PDA frequently disconnected from the rest of the system, initiates an application that is to be run as a long running transaction. The long running transaction accesses objects in the master version 110 (the user's own calendar) and objects in the set of cached objects 150 (the "free time lists" of the other participants) to make a decision in block 601. Information about meeting room assignments (cached as objects 550) is not available to the PDA user when the PDA is disconnected. A "findRoom" method always returns "true" when the PDA is disconnected, on the assumption that a suitable room will be found when the user reconnects. In this context, a method is a program or series of instructions provided to execute a task associated with a particular object type.

In block 601, a considerable amount of time may elapse (long running transaction) while the user examines the multiple calendar displays and determines that a meeting time satisfying the specified criteria is available. When the user finally makes a decision, the modifications made by the transaction are recorded as method invocations on the set of objects 110 and 150.

In one embodiment, method invocations are recorded as a predicate/transform pair in which the predicate is a method on the object that specifies what conditions must hold for the system to apply the transform, and the transform is a method that changes the state of an object being considered if the conditions of the predicate are satisfied. No predicates or many predicates may be needed to apply a given transform. Further, more than one transform may be associated with the same predicates.

In block 602, the LRTX system 175 records the set of predicates and, in block 603, and records the transforms invoked in the transaction. In the example, the system records the method invocations applied to a set of calendar objects and the rooms collection, for example:

Predicate: the calendars of all participants are free, and a room with the specified criteria is available (e.g., room is large enough for specified number of participants).

Transform: mark the calendars of all participants as scheduled for a meeting in the selected room.

In block 604, the user indicates that she wants the transaction committed, and the system marks the transaction as "commit pending" and queues the transaction for processing when the PDA reconnects to the system in block 605.

When the user running on a node 100 reconnects to the system, the LRTX System 175 attempts to commit the pending long running transaction. In a preferred embodiment, the LRTX system 175 initiates a short, ACID, transaction in block 606 so as to commit the changed objects 150 to an object database running on a node 500. The LRTX system 575 accesses the 550 objects so as to book a meeting room assignment and commits the changed objects 550 to an object database running on a node 500. In block 607, the short transaction preferably includes replaying the set of predicates ($P_i$) and transforms ($T_i$) recorded in an operational log from the PDA which are run as a short running transaction against the object versions 510 and 550 residing on the object databases running on nodes 500.

In this example, the changes made to the participants' calendars are propagated to the master version stored in a server's object database 501. Changes to the room assignments are propagated to the cached meeting room assignments stored in a server's object database 501.

In block 608, the LRTX system 175 checks whether a failure occurs during the replay phase of block 607. If a failure occurs, the LRTX system 175, advantageously, only rolls back or undoes the short transaction, and aborts the long running transaction in block 609. If no failure occurs, i.e., the predicates and transforms are still valid despite the possibly different state of the objects 510 versus objects 150, the LRTX system rolls back the short transaction, and proceeds with the long running transaction in block 610 after the test to determine external coordination capabilities in block 619. It is to be understood that the present invention permits the predicates and transforms to remain valid despite changes to the objects 510 of the server node 500. This permits concurrent access to the objects 510 by other transactions initiated by this or other users or devices possibly on other nodes 100, while work is continuing towards getting the LRTX committed. Prior art systems exclude other transactions/users from access to an object being considered for change by a transaction, and typically prior art systems reserve access for that transaction only until the transaction ends and releases its locks.

The LRTX system 175 propagates the state change for the objects caused by the transactions to a legacy business system running on a node 900. The predicates and transforms recorded in the operational log of the LRTX system 175 of the PDA are applied to non-object versions of the data stored on the legacy business systems running on nodes 900. As the legacy business systems do not have the same interface as objects in the object databases, parallel or equivalent legacy business system versions of these methods are invoked. The legacy business systems in this example may not support external transaction coordination, that is the capability to have its two-phase commit protocol drive/controlled by an external transaction manager (e.g. XA). Therefore, the predicates and transforms are run as a sequence of pseudo-transactions or pseudo-conversational transactions in block 611. This means an instruction set is developed to mimic the predicates and transforms provided externally to node 900. In the example, the legacy business system on node 900 is invoked to reserve the meeting room.

In block 612, the LRTX system checks whether a failure occurs during the replay phase. If it does, the pseudo-transaction cannot commit and the long running transaction is aborted. This process may need manual intervention to restore the legacy system to a proper state or may be performed automatically in block 613.

If no failure occurs, (i.e., the legacy version of the predicates and transforms are still valid when replayed against the master state of the legacy business system) the LRTX system 175 from node 100 initiates a short running ACID transaction on the object databases running on nodes 500 in block 614. The set of predicates and transforms are replayed against the objects on node 500, and the LRTX system 575 of node 500 determines whether or not the objects' current state is such that the transaction can commit in block 616.

If a failure occurs, the short transaction of block 614 is rolled back, and the long running transaction is aborted in block 613. If no failure occurs, the short transaction is committed in block 617, and the long running transaction is committed in block 618.

After block 608, it may be determined in block 619 if node 900 is capable of supporting external coordination. If node 900 is externally coordinatable, the predicate set and the transform set are replayed in block 620. If successful replay is achieved, the program path is directed to block 617 and 618 for committing the short and long running transactions, respectively. Otherwise, in block 622, the long running transaction is aborted and the short transaction is rolled back.

Enabling Objects for Long Running Transactions

Objects for participation in a long running transaction are preferably enabled as follows. In one embodiment of the present invention an operational log is employed to record methods that are invoked during the course of a long running transaction, as described above with reference to FIG. 2. By replaying the operational log in a short transaction, the LRTX is given traditional short running transaction ACID properties. In a preferred embodiment, a versionable object, i.e., an object in the set 110 or 150 (instantiated on node 100) follows certain rules to participate in a long running transaction. The same rules are followed for an object 510 or 550 (instantiated on node 500) to participate in a long running transaction. These rules represent the parameters by which the LRTX systems 175 and 575 (FIG. 1) make any object that is capable of participating in a long running transaction fulfill. By following these rules, the operational log is guaranteed to contain the information such that, when replayed, an equivalent set of operations to that executed during the rehearsal phase will be executed. The long running transaction (lrtx) will be aborted if failure occurs during the replay phase. In accordance with the present invention, versions of an object are determined and employed automatically to assist in permitting concurrent use.

The LRTX system 175 or 575 (FIG. 1) keeps a version of each object for each active LRTX which corresponds to the view of that object that is visible to the particular LRTX (in some cases the view will be that the object does not exist for this LRTX). The versions are accessible via a single facade object, so that the particular LRTX does not need to (and cannot) select the correct version. The LRTX system 175 or 575 (FIG. 1) automatically manipulates the versions as changes are made and the LRTXs are created, committed and rolled back. Facade design patterns are described in detail in *Design Patterns: Elements of Reusable Object-Oriented Software*, by Erich Gamma et al., Addison-Wesley Publishing Co., October 1994 (ISBN:0201633612) incorporated herein by reference.

Any method that changes the object's state is either a transform or executes in the scope of another transform, whether of the same or another object. A transform may have an associated predicate. The predicate is a method that, when executed, preferably returns a boolean indicating whether the transform may be executed. A predicate is a precondition for its associated transform's execution.

A caller of any transform should ensure that a suitable predicate (possibly null) is called before the transform is executed. A transform's predicate represents to the LRTX system (175, 575) a boolean condition such that the LRTX system will execute the transform if and only if the predicate is true. If a transform's caller indicates a null predicate (no conditions), the LRTX system is thus instructed that it should always execute the transform. Predicates may not change an object's state: i.e., a transform may not be nested in a predicate. The execution of every predicate is logged in an operational log that is part of an LRTX system (i.e., 175, 575), unless the predicate's execution is nested inside a predicate/transform pair. The execution of every transform is to be logged in an operational log that is part of an LRTX system unless the transform is executing inside a predicate/transform pair. Operation of a Long Running Transaction System Managing Externally Coordinatable Datastores Referring to FIG. 3, a flow/block diagram for operation of an LRTX System 175 for managing the objects that reside in datastores that support external transaction coordination is shown. In one embodiment, the external transaction coordination is performed using XA which is known to those skilled in the art.

LRTX System 175 preferably runs in one of two modes: rehearsal mode, 180, and performance mode 190. Rehearsal mode 180 is initiated when a user indicates "begin lrtx" in block 181, and terminates when a user indicates "commit lrtx" in block 182. When a user indicates "commit lrtx" in block 182, the performance or replay mode (phase) is initiated.

During the rehearsal mode 180, each time that a transform is executed and is to be logged in block 184, a calling object first accesses the LRTX System to log an associated predicate(s) in block 183. Then, the object executing the transform accesses the LRTX system 175 to log the transform in block 184. During the long running transaction, a user may at any time issue an "abort lrtx" command, in block 185, instructing the LRTX system to restore the state of participating objects to the state that existed at the beginning of the LRTX. In block 194, the pending commit for the LRTX is marked for execution.

During performance mode, the LRTX system 175 initiates a short running transaction involving the object databases that include objects having predicates and transforms recorded in the operational log which is a compressed version of the predicates and the transforms to be run in the long running transaction. Although a short running transaction is preferred to initiate communication other techniques are contemplated. In block 186, the LRTX system 175 issues a "begin tx" (begin short running transaction). This is the transaction coordinator for the short transaction. In block 187, the LRTX system 175 loops and for every method (predicates and transforms) recorded in the operational log for this LRTX, the LRTX system 175 replays the recorded method. Objects may include different versions, for example a parent version and a child version. Instead of invoking the method on the child version, the LRTX system 175 advantageously invokes the method on the parent version of every object in the LRTX. This aspect of the present invention permits multiple access to the objects to be transformed as long as the predicates are complied with. If a replayed predicate returns false in block 188, the LRTX system 175 first aborts the short running transaction in block 189 and then aborts the LRTX in block 191. If all recorded methods execute successfully, the LRTX system 175 first commits the short running transaction in block 192 and then commits the LRTX in block 193.

Figure 4:
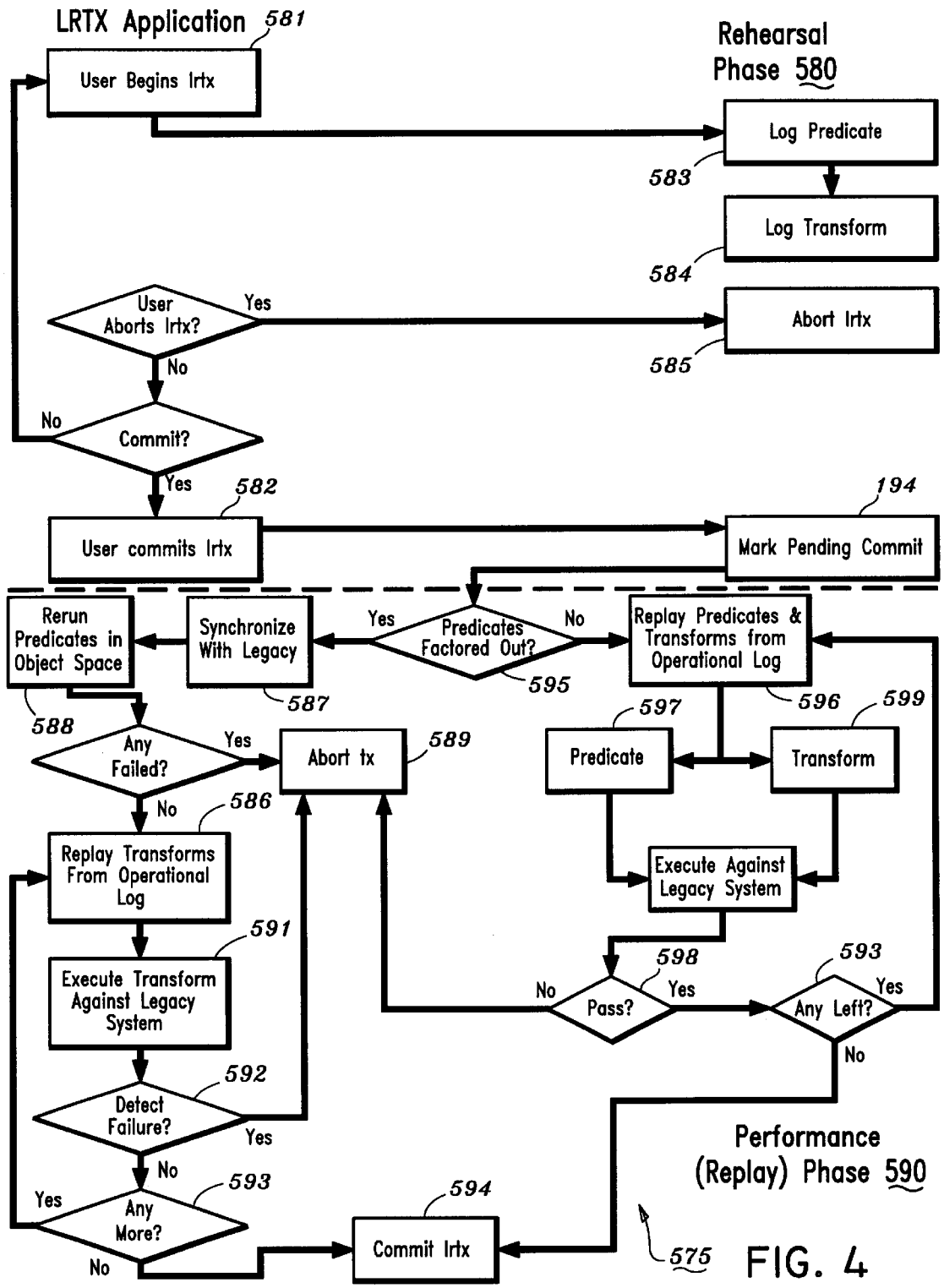
FIG. 4 is a flow/block diagram of another long running transaction system for implementing long running transactions from/to a server in accordance with the present invention.

Operation of a Long Running Transaction System Managing Datastores that are Not Externally Coordinatable Referring to FIG. 4, a flow/block diagram shows the operation of an LRTX system 575 for managing data hosted in datastores that do not support external transaction coordination. An LRTX system 575 behaves in the same fashion as an LRTX system 175 in rehearsal mode. However its behavior differs in performance mode.

A LRTX system 575 may run in one of two modes: rehearsal mode, 580, and performance mode 590. Rehearsal mode is initiated when a user indicates "begin lrtx" in block 581, and terminates when a user indicates "commit lrtx" in block 582. When a user indicates "commit lrtx" in block 582, performance mode is initiated.

During rehearsal mode, each time that a transform is executed and is to be logged, the calling object first accesses the LRTX System to log the associated predicate in block 583. Then, the object executing the transform accesses the LRTX system 575 to log the transform in block 584. During the long running transaction, a user may at any time issue an "abort lrtx" command, in block 585, instructing the LRTX system 575 to restore the state of participating objects to the state that existed at the beginning of the LRTX.

During performance mode 590, the LRTX system 575 cannot simply initiate a short running transaction so as to commit the participating objects' state changes, possibly because (a) the legacy business system typically hosts "data" as opposed to "objects" and (b) the legacy business system does not support external transaction coordination.

Instead, if in block 595, the transaction's predicates can be "factored out" such that the execution of all predicates up front is semantically equivalent to pair-wise predicate/transform execution. In other words, LRTX predicates and transforms are normally interleaved, for example, as follows: P1, T1, P2, T2, P3, T3. In some cases, it is possible to "factor out" the predicates so that they occur first, but the semantics of the sequence remain unchanged (all the predicates except the first one will typically change when this is performed). In this example, this yields a sequence P1, P2', P3', T1, T2, T3. The advantage of doing this is that during a replay all predicates can be verified before executing any transforms. For a legacy system that does not support external coordination, this becomes very useful because the transforms cannot be rolled back if one of the predicates fail.

In block 587, the LRTX system 575 synchronizes the transaction's participating objects 550 from the legacy business systems running on nodes 900. The set of predicates are then rerun in object space in block 588. If any predicate evaluates to false, the LRTX is aborted in block 589. Otherwise, in blocks 586 and 591, the LRTX system 575 loops over the set of transforms recorded in the operational log, and commits the LRTX to the legacy business systems on node 900 by driving the appropriate set of legacy business interactions (e.g., multi-screen navigation, screen scraping, and screen interaction) such that for every transform recorded in the operational log the host data (146 of FIG. 1) is transformed in an equivalent fashion. If the legacy business system on node 900 detects a failure during execution of a transform in block 592, the LRTX is aborted in block 589. Otherwise, from block 593, the LRTX is committed in block 594.

If in block 595 the transaction's predicates cannot be "factored out", the LRTX system 575 loops, from block 596, over the set of predicates and transforms recorded in the operational log. For each predicate in block 597, the LRTX system drives the equivalent legacy version to determine whether the predicate is still true. If any predicate evaluates to false in the legacy business system, in block 598, the LRTX is aborted in block 589. In block 599, transforms are similarly committed by driving the appropriate set of legacy business interactions (e.g., multi-screen navigation, screen scraping, and screen interaction) such that for every transform recorded in the operational log, the host data is transformed in equivalent fashion. If, in block 598, the legacy business system detects a failure during execution of a transform, the LRTX is aborted in block 589. Otherwise, the LRTX system evaluates the next predicate or transform from the log from block 596. If no predicates or transforms remain to be processed as checked in block 593, the LRTX is committed in block 594.

It is to be understood that the present invention may employ many features and aspects. For example, by providing an operational log persistent checkpointing may be performed to ensure proper programing or program execution, for example, if a server fails the LRTX will be restarted at the point where the failure occurred.

Figure 5:
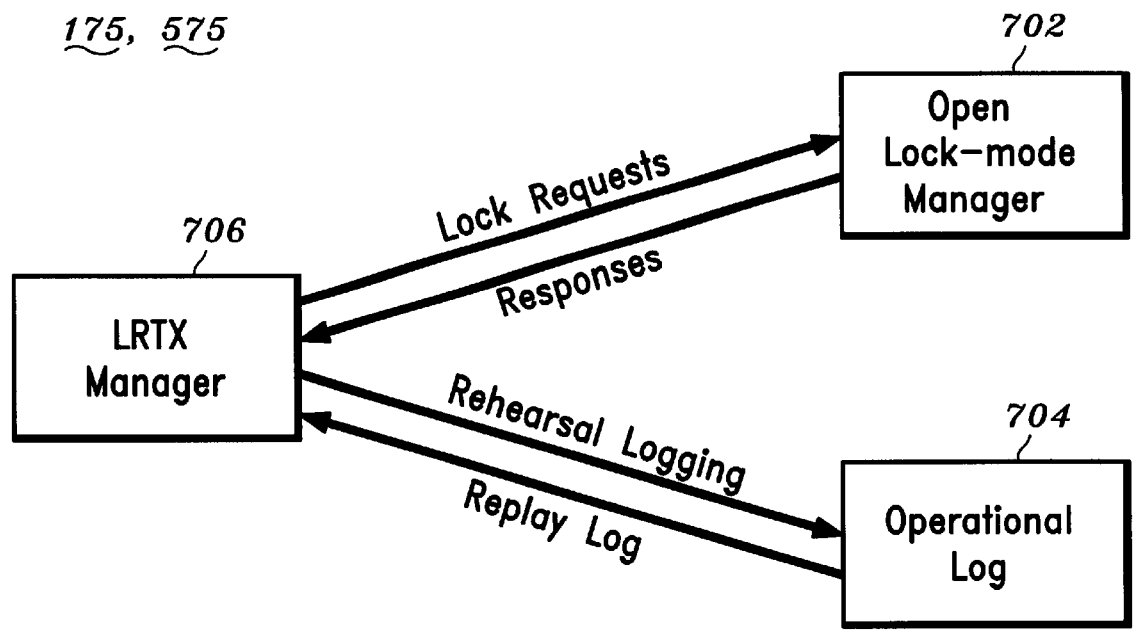
FIG. 5 is a flow/block diagram of a long running transaction system with a lock mode manager and an operational log in accordance with the present invention.

Referring to FIG. 5, by providing, open lock modes and automatic versioning, concurrency is provided which avoids false conflicts with other long running transactions. The lock modes are employed by providing objects with specialized lock structures which include open, operation-specific lock modes. The lock modes are managed by a lock mode manager 702. LRTX system 175 or 575 includes a LRTX manager 706 to manage the operations of the long running transactions. LRTX manager 706 sends lock requests to lock manager 702 and lock manager 702 responds with a status of the objects to be accessed to determine if states of the objects may be updated in accordance with the locks. The present invention includes lock modes which allow objects to define their own lock modes and lock compatibility matrices. Lock modes will be described for the present invention by the following illustrative example. A car insurance policy object may define three lock modes: ADD-CAR, BILLING and CHANGE-ADDRESS, each possibly corresponding (though not limited) to a business operation. The object further defines ADD-CAR and BILLING as compatible locks, but CHANGE-ADDRESS and BILLING as incompatible locks. Thus, in a LRTX system, a billing system may be prevented from using this insurance policy object while the mailing address is being changed (as these are incompatible business operations), but permit adding a car to the insurance policy while the address is being changed.

The present invention is preferably applied in an object oriented programming context although steps may be taken to adapt the present invention to non-object oriented programming contexts. Also, units of work such as a processed form may be made to follow visibility rules to make their state visible or invisible to other units of work. In one example, a digitally processed form may be filled in by several employees simultaneously, rules may be employed to prevent some employees from seeing portions of the form, rules may be employed to concurrently update the form in accordance with changes made by others.

ACID are achieved by the present invention by employing replay from an operational log 704 (FIG. 5) inside a short running transaction which supplies the ACID properties. Operational log 704 as described above includes a replay log for replaying a compressed version of predicate transform set in accordance with a user selected activity for a long running transaction. LRTX manager 706 provides rehearsal logging for the rehearsal modes for systems 175 and 575, as described above, to operational log 704. Advantageously, the systems of the present invention execute the replay short running transaction very quickly since no user interaction is needed during replay.

Figure 6A:
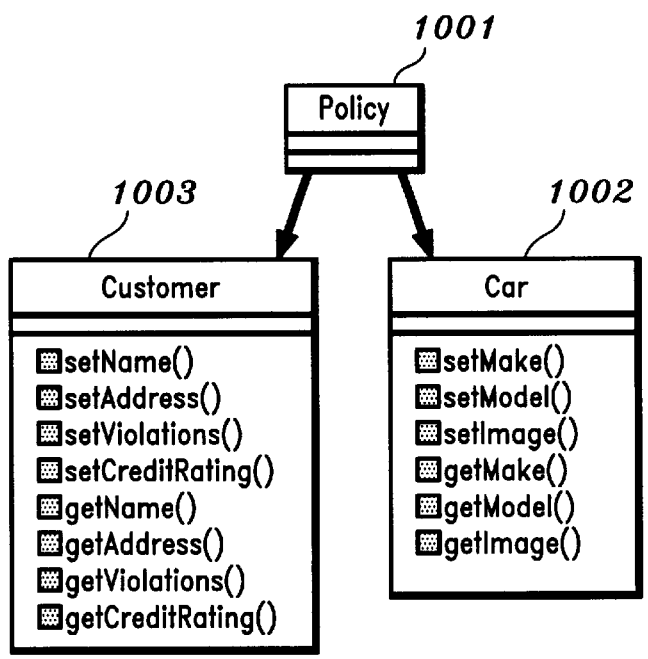
FIGS. 6A–6B depict an illustrative object model and task dependency graph for a programming model in accordance with the present invention.

An application programming model is employed in accordance with the invention for long running transactions. The following is a description of a non-limiting example of how the present invention may be employed. A long running business process (lrbp) may be implemented as a tree whose nodes include units of work (or uow), each of which is a nestable long running transaction. Because lrbp users may want the "ACID" properties that uow, like traditional, short running transactions, provide. Thus, in an example of an insurance company in FIG. 6A, the insurance company wants a Policy object 1001 for an insurance policy, comprised of the Car objects 1002 and Customer objects 1003, to be created in "all or nothing" fashion (atomicity), wants the state of the business to move only from one "good" state to another (consistency), does not want the intermediate states of the new Car and Customer objects 1002 and 1003 to be visible to other parts of the business (isolation) and wants the final and intermediate results to be permanent in spite of failures (durability).

Figure 6B:
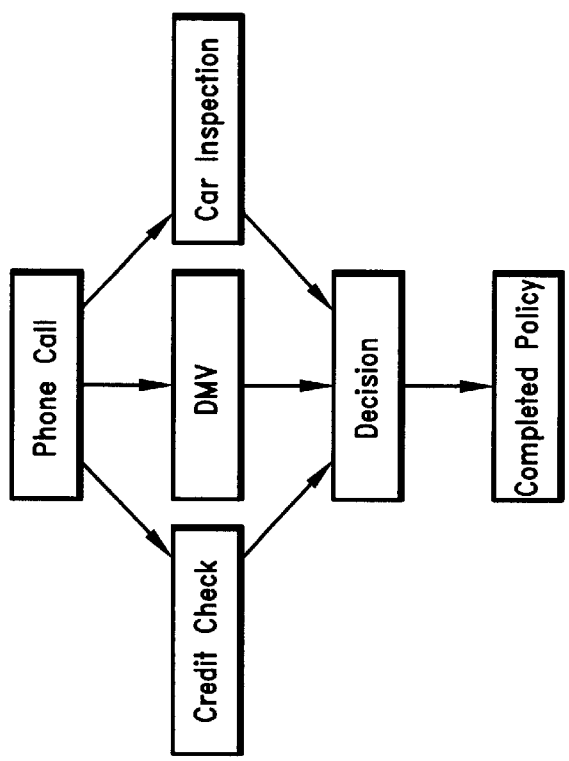

When modeled as a uow, the lrbp is decomposed into a set of subtasks that correspond to nodes shown in a dependency graph of FIG. 6B (where DMV is the department of motor vehicles). The "new policy" lrbp is initiated by requesting that the parent (or enterprise level) uow create a child "new policy" uow. Once a participant "joins" a uow, subsequent method invocations are performed within the scope of that uow. Isolation is provided during the course of the lrbp because nodes in the lrbp tree obey the following visibility rules:

1. The state of all objects in the scope of a parent uow is visible to all children of that parent.
2. When a child uow commits, state changes done to all objects within the scope of the child uow become visible to the parent uow.
3. State changes performed by a child uow are not visible to its siblings until the child now commits.

Figure 7:
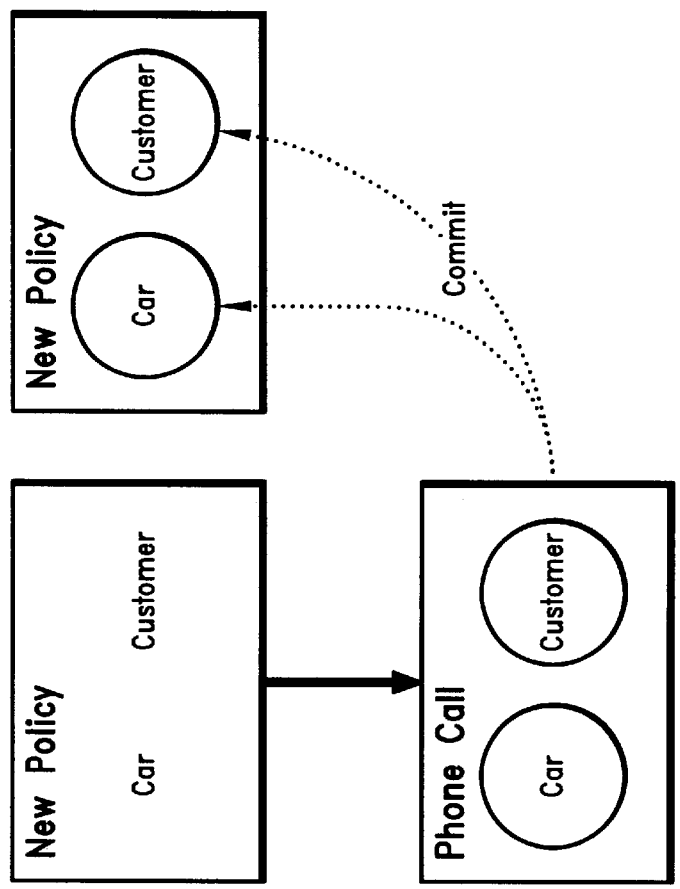
FIG. 7 is a unit of work tree showing the effect of committing a phone call unit of work in accordance with the present invention.

Thus, objects' state and their visibility are modified over time as uows are created, committed, or rolled back. Continuing the example, FIG. 7 represents a snapshot of the UOW tree as the "phone call" uow (a child of the "new policy" uow) commits. As a result, the Car and Customer objects that are created in the course of the customer's phone call become visible (and made persistent).

Figure 8:
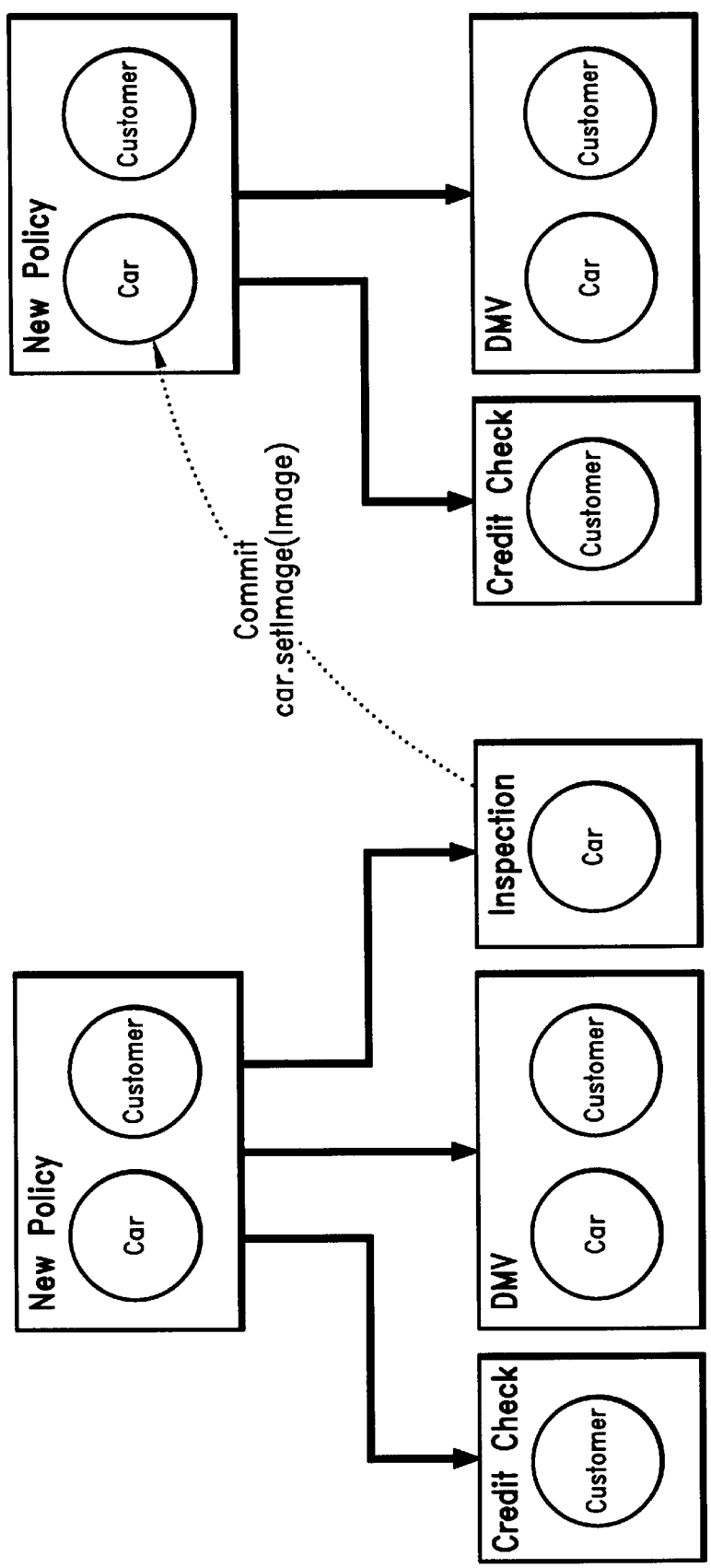
FIG. 8 is a unit of work tree showing the effect of committing an inspection unit of work in accordance with the present invention.

Referring to FIG. 8, a snapshot of the UOW tree as one of the 2nd-level tasks (the car inspection) completes is shown. The changes made to its version of the car (Car.image) are propagated to the parent's version. The car image was not visible to the "inspection" uow's siblings until the commit.

One feature of the uow programming model is that business logic is separated from uow semantics. Business object providers, in other words, concentrate on developing the function required by the long running business process: the framework is responsible for ensuring that uow semantics are provided when the objects are actually deployed. At a high level, therefore, an lrbp includes two types of object (provided by the framework), and various base objects (arbitrary, non uow-aware, object provided by business developers).

In the client view of the lrbp programming model, user interactions occur only with uow objects and base objects. The user interactions rely on the framework to transparently map method invocations onto the set of objects associated with their uow. The framework preferably enforces the protection implied by the visibility rules and, when a participant "commits", propagates the objects' state changes to the parent uow.

Figure 9B:
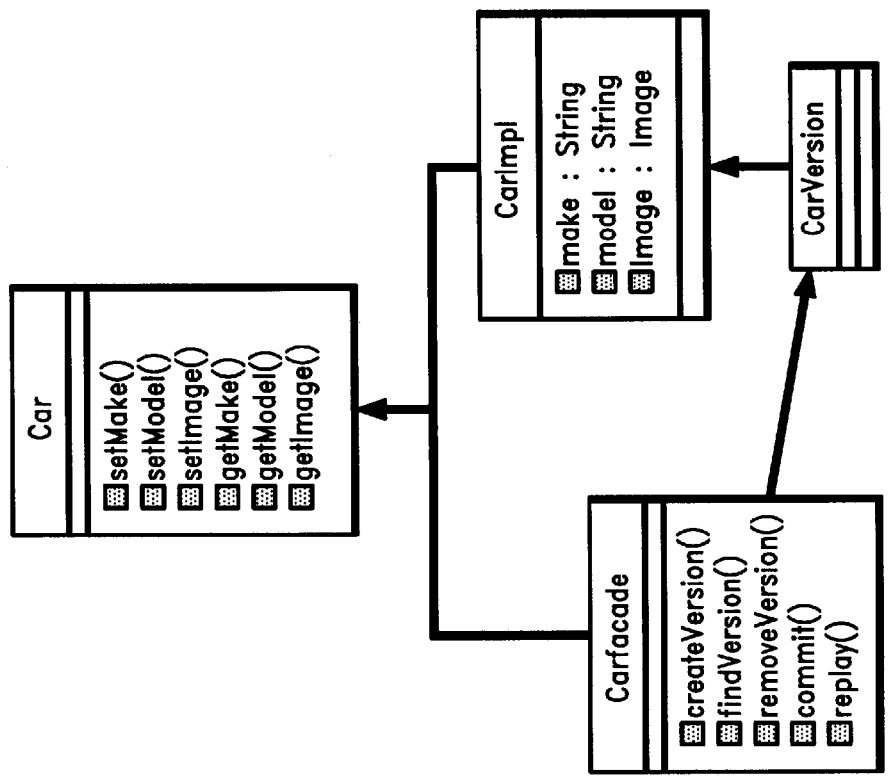
FIGS. 9A–9B depict a delegation of client methods and a facade and versionable car objects chart, respectively, in accordance with the present invention.
Figure 9A:
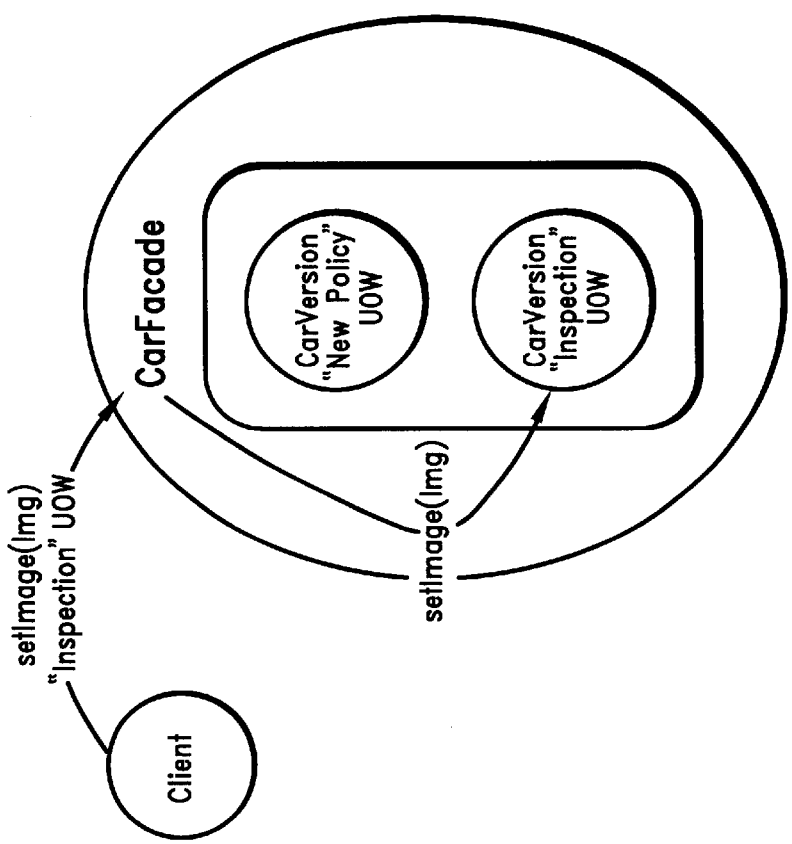

The server implements this transparent mapping by ensuring that the client never actually accesses a base object. Instead, the client accesses a facade object that, in turn, delegates the client's method invocations to versionable objects that are associated with individual uows. As shown in FIGS. 9A and 9B, each instance of a base object (e.g., a Car with VIN=42) is associated with an instance of facade object which wraps the set of versionable object instances. This set of versions corresponds to the set of currently active uows in which a client has referenced a specific base object.

The fact that client actually invokes methods on a facade requires the facade to extend the Car interface (as shown in FIGS. 9A and 9B): the facade then maps from the client's uow context (e.g., "inspection UOW") to the corresponding Car version to which it delegates the method invocation. The framework's task of generating the server-side facade and versionable objects on behalf of the client is made easier when base objects follow the "Bridge" design pattern, see *Design Patterns: Elements of Reusable Object-Oriented Software*, by Erich Gamma et al., as referenced above. Since clients code to an interface (e.g., Car in FIG. 9), the server-side objects need only provide a shallow wrapping implementation to satisfy the contract with the client, "real" implementation of the business methods is delegated to the (framework-independent) CarImpl provided by the business developer.

Through use of reflection techniques, the framework automatically generates facades and versionable objects from the base object.

Having described preferred embodiments of a system and method for programming and executing long running transactions (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for programming and executing long running transactions between interface devices and a server comprising the steps of:

providing a predicate set and a transform, the predicate set defining conditions for which updates to states in accordance with an activity are to be made and the transform set for applying the updated states pursuant to the predicate set;

committing the activity for processing upon establishment of communication with the server from the interface device;

establishing communication with the server from the interface device to initiate the long running transaction;

replaying the predicate set and the transform set for the server to determine if the long running transaction is capable of being committed on the server; and if capable of being committed on the server, committing the long running transaction to update states of the server wherein a plurality of interface devices are capable of executing long running transactions concurrently while competing to update states of the same data on the server and while maintaining transactional consistency.

2. The method as recited in claim 1, wherein the step of replaying the predicate set and the transform set for the server includes the steps of:

initiating a compressed version of the predicate set and the transform set for the long running transaction to compare against information included on a server database, to determine failures;

if failures are encountered, rolling back the compressed version and aborting the long running transaction; and otherwise, rolling back the compressed version and committing the long running transaction.

3. The method as recited in claim 1, wherein the states of the server are object based and the step of committing the long running transaction further includes the step of:

automatically selecting versions of the objects to permit concurrent access to the same objects by the plurality of interface devices.

4. The method as recited in claim 3, wherein the objects include open lock modes for excluding predetermined interface devices and predetermined transactions from being performed.

5. The method as recited in claim 1, wherein the long running transaction complies with ACID (atomicity, consistency, isolation and durability).

6. The method as recited in claim 1, wherein the server is other than an externally coordinatable transaction system and the step of committing the long running transaction further includes the step of invoking a sequence of operations to mimic the predicate and transform sets for execution on the server.

7. The method as recited in claim 1, further comprises the step of providing an operational log to record the predicates and transforms to provide a compressed version of the long running transaction.

8. A method for programming and executing long running transactions between interface devices and a server comprising the steps of:

interacting with an interface device to initiate a long running transaction;

providing a predicate set on the interface device for determining if the long running transaction is capable of being processed;

providing a transform set on the interface device associated with the predicate set, the transform set for carrying out instructions pursuant to the predicate set;

logging a compressed version of the predicate set and the transform set in an operational log on the interface device;

establishing communication with the server from the interface device;

replaying the compressed version of the predicate set and the transform set from the operational log to compare against information included on a server database, to determine failures; and committing the long running transaction by accessing information from the server data base such that a plurality of interface devices are capable of accessing the same information in the server data base at the same time.

9. The method as recited in claim 8, wherein the step of replaying includes the steps of:

if failures are encountered, rolling back the compressed version and aborting the long running transaction; and otherwise, rolling back the compressed version and committing the long running transaction.

10. The method as recited in claim 8, wherein the information from the server data base is object based and the step of committing the long running transaction further includes the step of:

automatically selecting versions of the object based information to permit concurrent access to the same object based information by the plurality of interface devices.

11. The method as recited in claim 10, wherein the object based information includes open lock modes for excluding predetermined interface devices and predetermined transactions from being performed and permitting concurrent access to the object based information.

12. The method as recited in claim 8, wherein the long running transaction complies with ACID (atomicity, consistency, isolation and durability).

13. The method as recited in claim 8, wherein the server is other than an external transaction coordination system and the step of committing the long running transaction further includes the step of invoking a sequence of operations to mimic the predicate and transform sets for execution on the server.

14. A system for programming and executing long running transactions comprising:

interface devices having a long running transaction system for initiating and maintaining long running transactions;

a server capable of establishing communication with the interface devices for interacting with and processing the long running transaction with the interface devices;

the long running transaction system further comprising:

means for providing a predicate set and a transform set on an interface device for initiating a long running transaction, the transform sets for carrying out instructions pursuant to the predicate set;

means for replaying the predicate set and the transform set for the server to compare against information included on a server database, to determine failures; and means for committing the long running transaction by accessing information from the server data base such that a plurality of interface devices are capable of accessing the same information in the server data base at the same time.

15. The system as recited in claim 14, wherein the means for replaying includes:

means for providing a compressed version of the predicate set and the transform set for the long running transaction to compare against information included on a server database, to determine failures such that if failures are encountered, the compressed version is rolled back and the long running transaction is aborted, otherwise, the compressed version is rolled back and the long running transaction is committed.

16. The system as recited in claim 14, wherein the information from the server data base is object based and the means for committing the long running transaction further includes automatically selected versions for the object based information to permit concurrent access to the same object based information by the plurality of interface devices.

17. The system as recited in claim 16, wherein the object based information includes open lock modes for excluding predetermined interface devices and predetermined transactions from being performed and permitting concurrent access to the object based information.

18. The system as recited in claim 14, wherein the long running transaction complies with ACID (atomicity, consistency, isolation and durability).

19. The system as recited in claim 14, wherein the server is other than an external transaction coordination system and the means for committing the long running transaction further includes a sequence of operations invoked to mimic the predicate and transform sets for execution on the server.

20. The system as recited in claim 14, further comprises an operational log to record the predicates and transforms to provide the compressed version of the long running transaction.

* * * * *